United States Patent [19]

Möller et al.

[11] Patent Number: 4,547,379

[45] Date of Patent: Oct. 15, 1985

[54] METHOD FOR CORNING MEAT

[75] Inventors: Erwin Möller, Wuppertal; Siddik Iyimen, Lohmeyer Str. 46, 6600 Saarbrücken, both of Fed. Rep. of Germany

[73] Assignee: Siddik Iyimen, Saarbrücken, Fed. Rep. of Germany

[21] Appl. No.: 584,297

[22] Filed: Mar. 2, 1984

Related U.S. Application Data

[63] Continuation of Ser. No. 428,916, Sep. 30, 1982, abandoned, which is a continuation of Ser. No. 244,300, Mar. 16, 1981, abandoned.

[51] Int. Cl.$^4$ .......................... A23B 4/00; A23L 1/31; A23P 1/00
[52] U.S. Cl. .................................. 426/281; 426/519; 426/641
[58] Field of Search ............... 426/264, 281, 641, 652, 426/513, 519; 99/532, 533, 534, 535

[56] References Cited

U.S. PATENT DOCUMENTS

| | | | |
|---|---|---|---|
| 3,006,767 | 10/1961 | Huckabee | 426/281 X |
| 3,149,554 | 9/1964 | Greenspan | 426/281 X |
| 3,347,679 | 10/1967 | Nordin | 426/281 |
| 3,565,639 | 2/1971 | Schack et al. | 426/281 X |
| 3,615,704 | 10/1971 | Pedersen | 426/281 |
| 4,038,426 | 7/1977 | Jespersen et al. | 426/281 X |
| 4,229,458 | 10/1980 | Dreano et al. | 426/281 X |

FOREIGN PATENT DOCUMENTS

| | | |
|---|---|---|
| 2528471 | 1/1977 | Fed. Rep. of Germany . |
| 2615003 | 11/1977 | Fed. Rep. of Germany . |
| 2700125 | 7/1978 | Fed. Rep. of Germany . |
| 2712258 | 9/1978 | Fed. Rep. of Germany . |
| 413183 | 7/1934 | United Kingdom ................ 426/281 |

Primary Examiner—Arthur L. Corbin
Attorney, Agent, or Firm—Karl F. Ross; Herbert Dubno

[57] ABSTRACT

A piece of meat is corned by first being injected with a pickling solution and then compressed between ridges of a corrugated roller and a smooth counterroller with a relatively high pressure—about 70 daN/cm$^2$—for a relatively short time—0.5–1.0 sec—and is thereafter agitated in a pickling solution.

1 Claim, 2 Drawing Figures

METHOD FOR CORNING MEAT

This application is a continuation of application Ser. No. 428,916, filed Sept. 30, 1982, now abandoned, which is a continuation of Ser. No. 244,300, filed Mar. 16, 1981, and now abandoned.

FIELD OF THE INVENTION

Our present invention relates to a method of corning, that is treating with brine, boneless pieces of meat.

BACKGROUND OF THE INVENTION

A piece of meat is corned both to make it last longer and to improve the flavor of a frequently inexpensive cut. The most ancient process of corning simply relies on the steeping or macerating of pieces of meat in the salt solution, which may contain a flavoring or sweetening ingredient, for a long period of time, normally several days. Substantial time is needed in order to insure that the corning solution completely saturates the piece of meat being treated. The meat is made up of individual cells through whose walls the corning solution must pass osmotically, so the procedure is inherently slow.

In recent times mass-production corning has substantially cut down the overall treatment time by the main expedient of injecting the corning solution into the piece of boneless pork or ham by use of a multiplicity of needles. Thus the piece of meat being corned is passed through a machine having a vertically displaceable array of needles which descend into the piece of meat and inject it with the corning liquor. Such a procedure can cut down the treatment time substantially by insuring that the corning liquor does not have to soak from the outside of the piece of meat all the way to the inside. Still the time needed is substantial. Such an arrangement is described in German published patent application No. 2,700,125 filed Jan. 4, 1977 by H. Sommer and W. Schenbrenne.

It is also known to speed up the overall treatment time by agitating the piece of meat in a bath of the brine or corning solution. This procedure is preferably carried out after the meat has been injected with the corning solution, and can then cut the overall treatment time to 20–30 hours. German published patent application No. 2,712,258 filed Mar. 21, 1977 by P. Thirode describes such a system which also employs a subatmospheric pressure in the treatment hopper for further decreasing the treatment time.

It is also known to prick the surface of the meat in a multiplicity of locations, forming a multiplicity of entrance holes for the brine. Such methods are described in German published patent application No. 2,528,471 filed June 26, 1975 by P. Michaels and in German published patent application No. 2,615,003 filed Apr. 7, 1976.

At best these methods require a treatment time of about one day. Thus a great deal of equipment is tied up in the mass production of such corned meat products. As a result the cost of the products is elevated substantially.

OBJECTS OF THE INVENTION

It is therefore an object of our present invention to provide an improved method of corning, that is treating with a salt solution, a piece of meat.

Another object is to provide such a method which can produce a fully corned piece of meat in a relatively short time without physically degrading the piece of meat.

SUMMARY OF THE INVENTION

These objects are attained, according to the instant invention, principally by compressing a piece of meat between a pair of surfaces after the meat has been injected with a pickling solution. According to this invention the pressure is maintained for an interval between 0.1 sec and 2.0 sec and lies between 1 daN/cm$^2$ and 80 daN/cm$^2$. The pressure is increased from 0 to a substantially constant maximum level and then decreased back to 0. Preferably the pressure is applied for between 0.5 and 1.0 second and reaches a maximum of 50 daN/cm$^2$.

We have found, according to the instant invention, that this iterative pressing of the piece of meat after it has been injected with the corning liquid allows the subsequent agitating operation in a bath of the liquid to be reduced from a time of 10–20 hours to about 30 minutes. Obviously this represents an enormous saving in processing time, as the length of pressing time is nominal. Thus, it is possible for a smaller plant to produce considerably more corned meat than has hitherto been possible. Normally, it is noted, the meat is cooked by boiling or the like after it has been fully corned and before it is marketed.

According to further features of our invention the pressure is successively applied to the meat at a plurality of locations closely spaced from one another, namely along strip zones substantially smaller than the surface area of the piece of meat. It is possible in this manner to obtain a limited penetration of the surface so that the pressure can be effective inside the piece of meat.

This is most easily achieved according to the instant invention by passing the piece of meat between a pair of rollers. One of the rollers can move toward and away from the other roller and is urged toward this other roller by means of a pneumatic ram with a predetermined fixed biasing force. Thus, no matter how far apart the rollers are, the pressure the one roller exerts toward the other will remain the same. The first-mentioned roller is formed with a plurality of longitudinally extending ridges or corrugations with blunt crests which may be subdivided by a circumferential ridge into a plurality of ridge sections. The other roller is cylindrical. Thus, as the meat passes between the rollers it will be pressed tightly by these ridges, with the grooves between the ridges allowing some expansion in intervening areas. The ridges not only insure a good pressing operation, but ensure positive entrainment of the meat through the nip between the rollers.

According to further features of this invention the meat is moved into the nip between the rollers by a conveyor belt which is operated at the same speed as the peripheral speed of the two rollers. The two rollers are driven jointly but in opposite directions.

SPECIFIC DESCRIPTION

Figure 1:
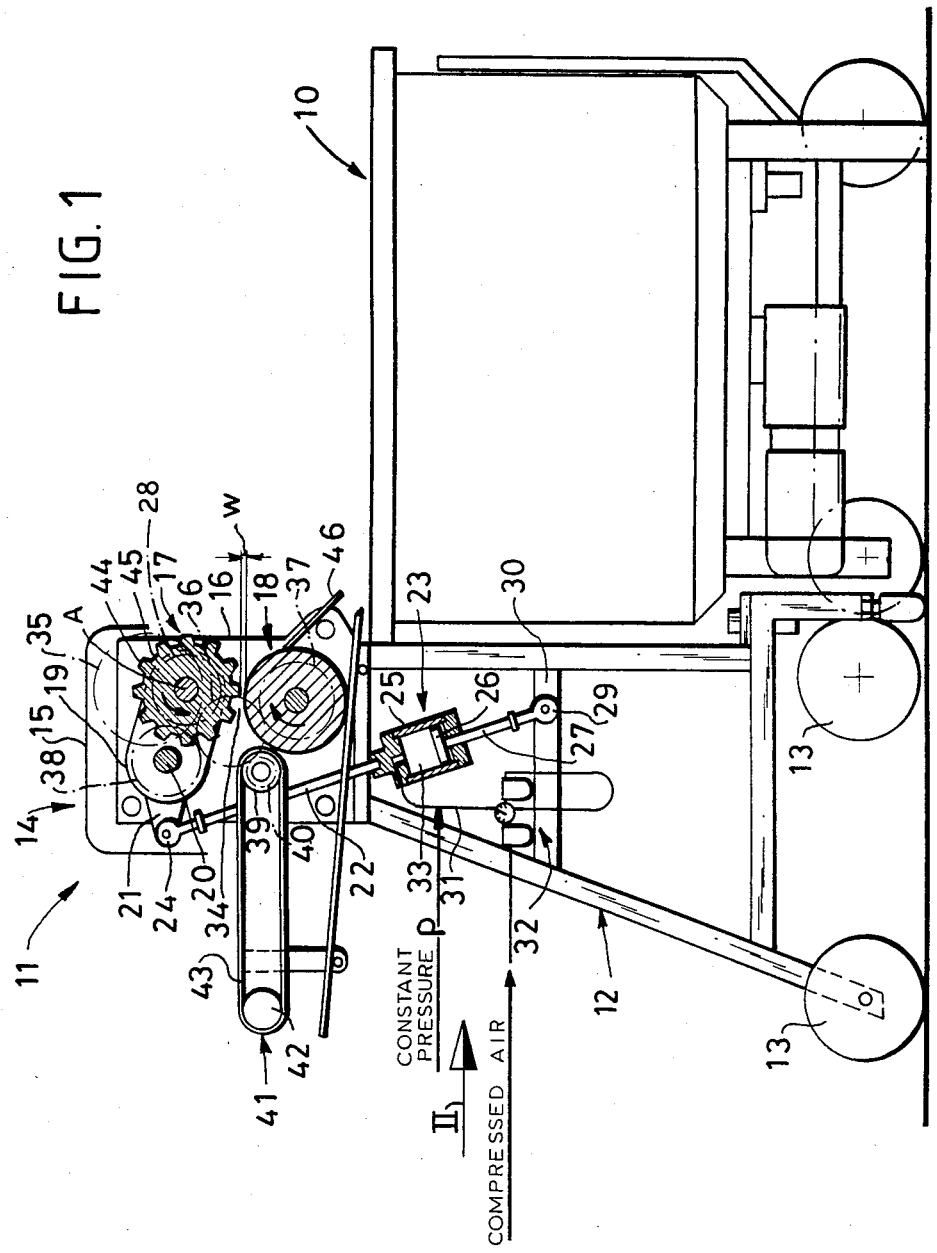
FIG. 1 is a partly sectional and partly schematic side view of an apparatus for positioning the meat according to this invention.
Figure 2:
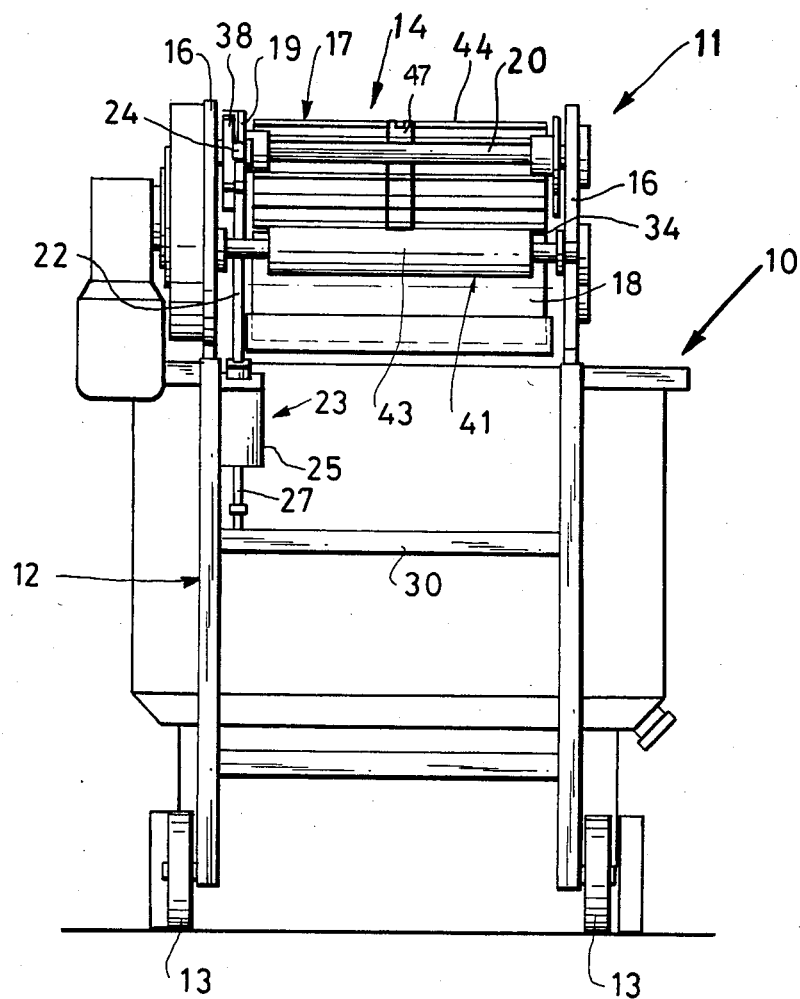
FIG. 2 is an end view taken in the direction of arrow II of FIG. 1.

As seen in FIGS. 1 and 2, a pressing apparatus 11 for practicing our invention is adapted to operate in conjunction with a standard meat-agitating apparatus 10.

The apparatus 10 as shown here is of the type known under the trade name "protecon-massager" produced by Protecon Ltd., Bedford Engineering Works, Bedford, Great Britain. The hopper of such a device can have a capacity of 200,320 or 850 liters. Inside the apparatus there are several paddles which keep the meat in circulation in a brine bath.

The apparatus 11 has a frame 12 with wheels 13. On its upper side it is provided with a housing 14 having a cover 15 in which there is provided a frame 16 for an upper press roller 17 and a lower press or transport roller 18. The upper roller 17 is carried on a pair of arms 19 pivoted about a horizontal axle 20 and having at one end a short extension 21 on which is pivoted an end 24 of a connector rod 22 extending from a cylinder 25 of a pneumatic ram 23. The ram has a piston 26 having a piston rod 27 whose end 29 is connected to a cross member 30 of the frame 12. Compressed air is fed through a pressure-regulating device 32 to a pneumatic feed line 31 so that a chamber 33 defined between the upper face of the piston 26 and the cylinder 25 remains pressurized with a constant pressure p.

The upper roller 17 defines with the lower roller 18 a nip 34 having a gap width w defined by the piston/cylinder assembly 23. Since the pressure p in the cylinder 33 remains constant, the pressure which the roller 17 exerts down against the roller 18 will remain contant regardless of the size of this gap width w.

A main drive gear 35 driven by a nonillustrated heavy-duty electric motor meshes with a gear 36 meshing in turn with a gear 37 fixed to the roller 18 and with a gear 38 carried on the axle 20 and meshing with a gear 28 fixed on the roller 17. Thus the drive gear 35 will drive the two rollers 17 and 18 synchronously, that is at the same peripheral speed, but in opposite directions as indicated by the arrows.

A pair of rollers 39 and 42 have a conveyor belt 43 spanned over them to form an intake conveyor 41. The roller 39 carries a gear 40 meshing with the gear 36 so that the belt 43 is advanced at a speed identical to the peripheral speed of the rollers 17 and 18. Downstream of the nip 34 there is provided a slide 46 for feeding meat that has passed through the nip 34 into the hopper of the massager 10.

As also seen in FIG. 1, the upper roller 17 is centered on an axis A and is formed with a plurality of axially extending trapezoidal ridges or corrugations 44 that taper radially outwardly and are separated by complementary grooves 45. We have found that these are best dimensioned with the ridges 44 having a base width equal approximately to their overall height. Grooves 45 are generally complementary to the ridges 44 whose blunt crests define the aforementioned nip 34 with the periphery of roller 18; thus, the grooves and the crests are of approximately the same width. FIG. 2 shows how a circumferential groove 47 having a depth equal to that of the grooves 45 may be formed in the roller to subdivide the ridges 44 into axially spaced ridge sections. The roller 17 is urged toward roller 18 under a biasing force of approximately 70 daN. The ridges 44 have a transverse width of 1 cm and an overall length of 50 cm.

The pressure regulator 32 feeds pressure between 1 bar and 15 bar to the cylinder chamber 33. The piston 26 has an effective surface area of 120 $cm^2$, so that the pressure that the roller 17 can exert on a piece of meat passing through the nip 34 can lie between 1 and 80 $daN/cm^2$ (daN=dekanewton). That pressure includes, of course, a component contributed by the weight of the roller.

With the system according to the instant invention boned pieces of meat, normally pork or beef, are loaded onto the conveyor 41 after having been thoroughly injected in the normal manner with pickling liquid. The conveyor 43 then moves them up to the nip between the rollers 17 and 18 so that the meat is compressed substantially at the pressure given above. It is possible to run the meat through the rollers 17 and 18 twice, or to provide two sets of rollers, one downstream of the other, for double processing. Moreover, it is sometimes advisable to groove the contact areas of the ridges 44 slightly to insure that the meat is properly gripped. Normally a rotation speed of about 18 rpm is used for the rollers 17 and 18.

With that speed of rotation, and 12 ridges 44 of roller 17 spaced apart by distances about equal to their width as shown in FIG. 1, the meat is compressed 3.6 times per second between these ridges and the smooth peripheral surface of roller 18 along strip zones separated by intervening expansion zones of approximately equal width. With pieces of meat whose thickness substantially exceeds the width w of nip 34, each rib will be in actual contact with the meat for well over the time of about 0.15 second during which the crest of the rib confronts the roller 18.

We have found according to the instant invention that the time for agitation in the apparatus 10 can be cut from a minimum of 10 hours down to about 30 minutes. This obviously greatly increases the productivity of a corning plant as here disclosed.

We claim:

1. A method of treating a piece of meat that has been injected with a pickling solution, comprising the steps of:
   (a) introducing the piece of meat to be treated into a nip between two counterrotating rollers with parallel axes of rotation, one of said rollers having equispaced peripheral ridges parallel to said axes, the other of said rollers being smooth-surfaced;
   (b) biasing said rollers toward each other with a substantially constant relative pressure tending to reduce the width of said nip between ridges of said one of said rollers and the smooth surface of the other roller to substantially less than the thickness of said piece of meat whereby spaced-apart strip zones of said piece of meat are compressed by said ridges while intervening expansion zones of said piece of meat are left uncompressed during transit through said nip; and
   (c) thereafter agitating said piece of meat in pickling solution, said ridges having a width of about 1 cm and substantially equaling their spacing whereby the compressed zones and the intervening zones of said piece of meat are approximately of the same width, said ridges each compressing said piece of meat for a minimum period of about 0.1 second.

* * * * *